Aug. 29, 1950 V. J. MEANY 2,520,607
CAM-MAKING LATHE ATTACHMENT
Filed Nov. 20, 1946 2 Sheets-Sheet 1

INVENTOR
VINCENT J. MEANY
BY David J. Bonett
ATTORNEY

Aug. 29, 1950 V. J. MEANY 2,520,607
CAM-MAKING LATHE ATTACHMENT
Filed Nov. 20, 1946 2 Sheets-Sheet 2
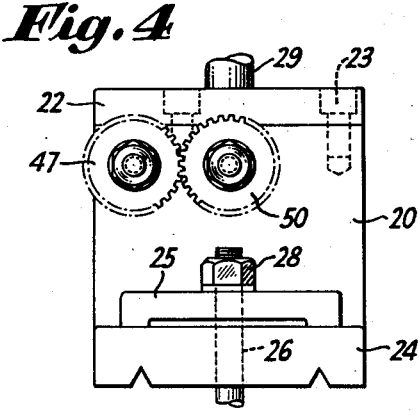
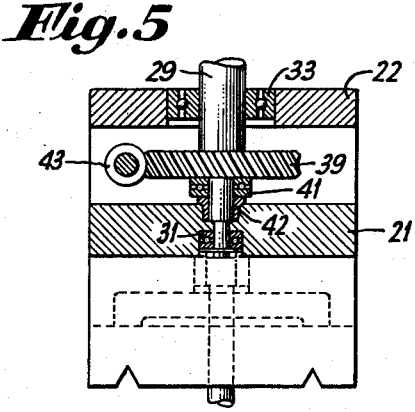
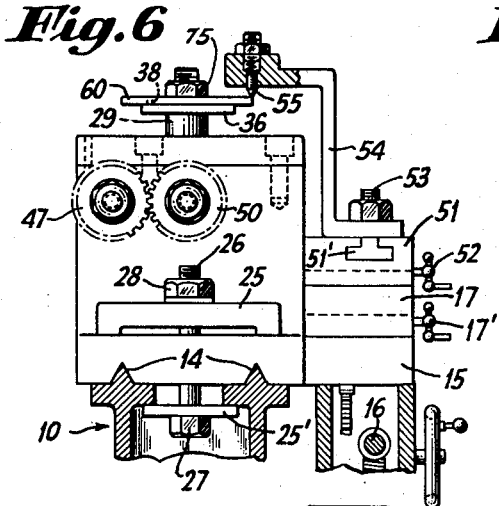
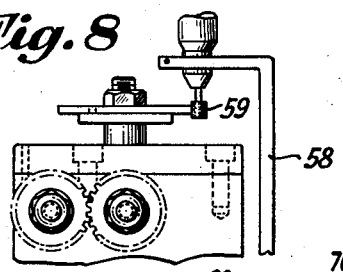
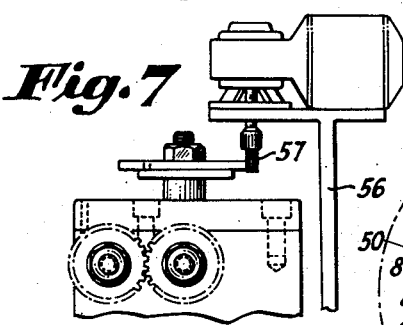
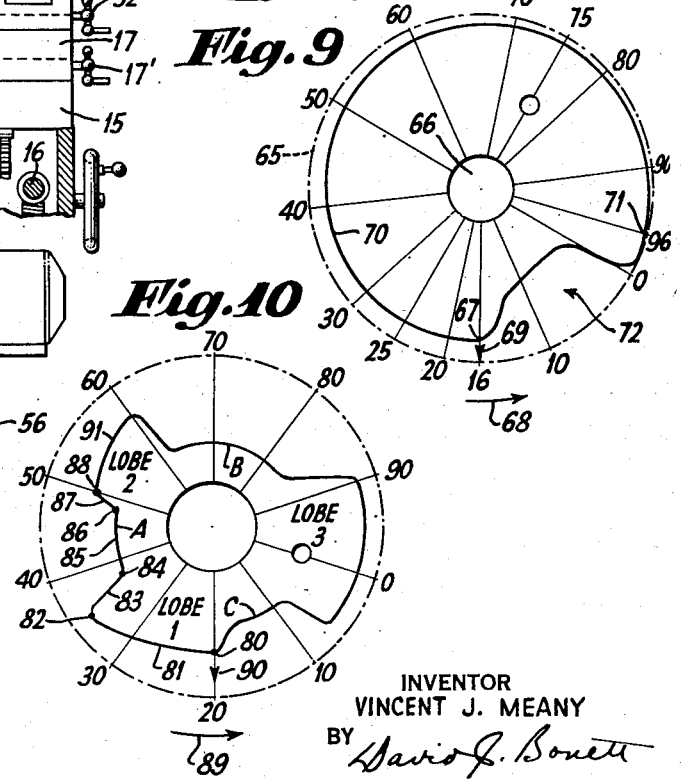
INVENTOR
VINCENT J. MEANY
BY David J. Bonett
ATTORNEY Patented Aug. 29, 1950

2,520,607

UNITED STATES PATENT OFFICE 2,520,607

CAM-MAKING LATHE ATTACHMENT

Vincent J. Meany, Passaic, N. J., assignor of one-fourth to Thelma Winrock, Staten Island, N. Y., one-fourth to Eleanor Cooper, Hasbrouck Heights, and one-fourth to Edward Torsney, Newark, N. J.

Application November 20, 1946, Serial No. 711,181

6 Claims. (Cl. 90—15)

My present invention relates to a novel method of making cams and to a machine for carrying out this method whereby the manufacture of cams for the machine tool industry may be expedited.

At present a common practice of cam-making involves first the laying out by hand of the cam shape or contour on a circular cam blank which is marked off by a multiplicity of equiangularly spaced radii, usually one hundred. Along each radius the precise throw that the cam is to have at that particular point is measured and marked off, and a smooth curve which will then define the desired cam shape is drawn joining the several marked off points. The next step consists in roughly cutting away the excess material, as by means of a band saw. This is followed by hand-filing as accurately as possible down to said laid-out curve, or cut on an expensive universal milling machine. Obviously this hand method of cam-making is tedious, time consuming, not too precise, and costly.

It is therefore one of the objects of my invention to provide a method of cam-making and a machine therefor with which it is possible to manufacture precision cams at a minimum cost, without the need of skilled labor, and at a much lower cost than at present.

A further object of my invention is to provide a cam-making attachment for a lathe which is simple in operation and construction, has very few, if any, wearing surfaces, requires only a few machined parts, and requires very little or no maintenance.

More specifically, my invention contemplates an attachment or fixture which is usable in conjunction with an ordinary screw-cutting lathe, and which is provided with a shaft and suitable reduction gearing whereby said shaft of the attachment may be driven from the lathe at a predetermined reduced speed, said shaft having a cam-blank to be shaped keyed thereon, and the cross-slide, power fed from the lathe also at a predetermined reduced speed, is arranged to support the necessary tools or devices, such as scribing tool, grinder and milling tool, in cooperative relation with the rotating cam-blank for automatically laying out, cutting away and machining the cam to a high degree of accuracy.

With the above and other objects in view, my invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Fig. 4 is a side view, looking from the left in Fig. 2;

Fig. 5 is a cross-sectional view taken along the line 5—5 of Fig. 2;

Figs. 6, 7 and 8 are views similar to that shown in Fig. 4, showing, respectively, the scribing, grinding and milling attachments in operative position; and Figs. 9 and 10 show, by way of example, particular cams of desired shape or contour which will serve to explain the procedure which is followed in the course of manufacture of such cams in accordance with my invention.

Figure 1:
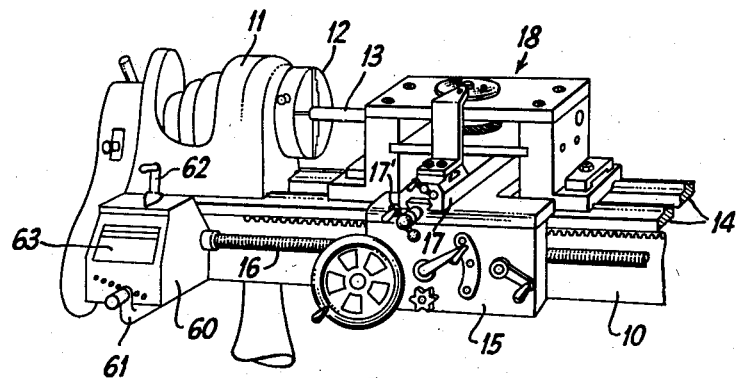
Fig. 1 is a view, in perspective, of the cam-making attachment of the invention in operative position on the lathe.

Referring to the accompanying drawings, and more particularly to Fig. 1, there is illustrated an ordinary type of known screw-cutting lathe which includes a base or bed 10 upon which is supported at the left the usual headstock 11. The tailstock which is supported on the base at the right is not shown. A spindle and gearing (not shown) for driving the spindle are housed in the headstock, and mounted on the right-hand end of the spindle is a chuck 12. In the customary use of the lathe the chuck is adapted to receive a work-piece (not shown) to be machined or otherwise worked on. In the use of the present invention, the cam-making attachment is provided with a drive shaft 13 which is arranged to be keyed to or gripped by the chuck and therefore to be driven by the lathe.

The lathe bed 10 has mounted on its V-ways 14 a longitudinally movable carriage 15 which may be of the customary type and which in a known manner is adapted to be power fed toward and away from the headstock 11 by means of a lead-screw 16. Upon the carriage 15 is mounted the usual cross-slide 17 which is adapted by means of its lead-screw (not shown) to be power fed in a transverse direction. By means of a cross feed knob 17' the cross slide is caused to be moved manually.

Figure 2:
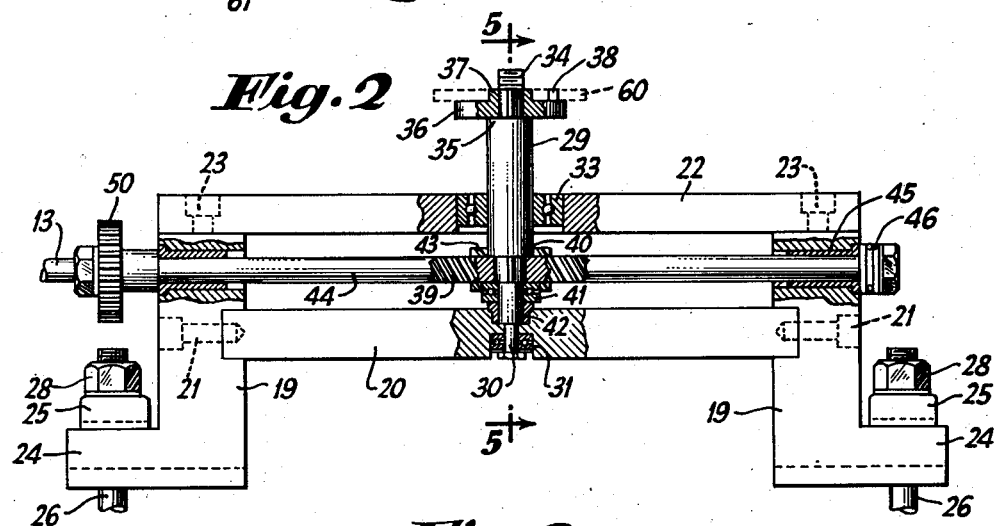
Fig. 2 is a front elevational view, partly in section, of the attachment shown in Fig. 1.
Figure 3:
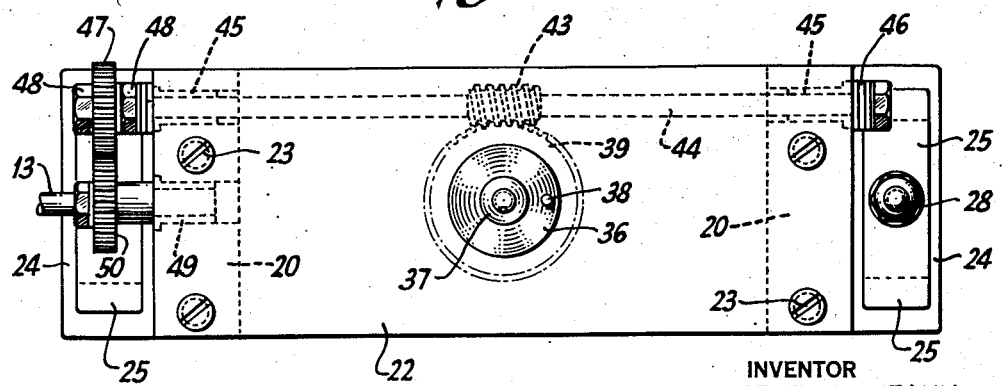
Fig. 3 is a plan view of Fig. 2.

The cam-making attachment according to my invention, shown generally at 18, is also mounted on the ways 14 and comprises (Fig. 2) a steel frame having a pair of up-standing sides 19, a cross-plate 20 extending between the sides and secured thereto as by means of screws 21, and a top plate 22 suitably secured to the upper ends of the sides, as by means of screws 23. The frame is adapted to straddle the cross-slide 17 as shown in Fig. 1 and to be rigidly affixed to the lathe bed by suitable means. For this purpose each of the two frame sides 19 is provided with an extension or leg 24 on which there is supported a clamping member 25. A second clamping member 25' (see Fig. 6) is bridged across the lower adjacent edges of the ways, and a stud 26 which passes through suitable holes in the two clamps and extension is provided with a head 27 at the lower end and with a nut 28 at the upper end, so that by tightening up on the nuts, one on each side, the attachment is securely mounted in operative position on the lathe bed.

Extending upwardly from the frame, and centrally located in the top plate, is a shaft 29, the lower end 30 of which is reduced and journalled within a thrust bearing 31 in the cross-plate 20. The shaft is also journalled at an intermediate part within a bearing 33 retained in the top plate 22. At its upper end the shaft is provided with another reduced portion 34, and adapted to be supported on a shoulder 35 at this end is a circular cam-supporting plate 36 which is keyed to said reduced shaft portion. This cam-plate is provided with a hub portion 37 and a locating pin 38, the purpose of which will be described later.

Located in the space between the top plate 22 and the cross plate 20 is a worm wheel 39 which is keyed to the shaft 29 between a shoulder 40 and a second thrust bearing 41. The latter bears on a bushing 42 of "oilite" which in turn is fitted into the cross plate. Geared to the wheel 39 is a worm 43, keyed to a shaft 44 which extends between and is journalled at its ends within bushings 45 in the sides 19. A thrust bearing 46 is provided for the worm shaft at the right, and a spur gear 47 is keyed on said shaft at the left and is retained in position by suitable means such as the nuts 48. The lathe-driven shaft 13, previously mentioned, has its end remote from the chuck end journalled within a bushing 49 in the side member at the left, and a second spur gear 50 is carried at that end and is in mesh with the gear 47 on the worm shaft.

Referring now to Figs. 6 to 8, 51 is the tool-post compound which is transversely adjustable on the cross-slide 17 by means of a knob or handle 52. The tool-post compound is adapted to have bolted within its T-shaped groove 51' a selected one of several tool-carrying brackets by means of a pair of bolts 53, only one of which is shown in the drawing. In Fig. 6 this bracket is designated 54, the upper end of which carries a suitable scribing tool 55. In Fig. 7 the bracket is designated 56, and at the upper end there is mounted a motor-operated milling attachment 57. In Fig. 8 the bracket is designated 58 and is adapted to have a motor-operated grinder 59 suitably clamped at its upper end. The grinder may be of the type generally known as the "Dumore No. 4."

Operation of the cam-making machine or attachment above described is based on a gear reduction principle. A suitable gear ratio is chosen for worm 43 and worm wheel 39. For illustrative purposes, let us assume a gear ratio of 40 to 1 so that for 40 revolutions of the worm shaft 44 the cam carrying shaft 29 makes 1 complete revolution. Therefore, with a 1 to 1 ratio of the spur gears 50 and 47 (which is the ratio shown in the drawings), the ratio of actual spindle speed to cam shaft speed would also be 40 to 1. This latter ratio may be varied however, that is, increased or decreased, by substituting for the 1 to 1 ratio gears, other gear sets having different appropriate ratios so that the ratio spindle speed to cam shaft speed would be 20 to 1, 30 to 1, 50 to 1, 60 to 1, etc.

For a particular spindle speed there is also a definite speed of rotation of the lead screw 16, and consequently of the cross-slide 17 which is driven from the lead screw. Therefore, in a lathe equipped with a quick change gear box of 48 stations, it is possible to obtain 48 different speeds or movements of the cross-slide. The gear box is shown at 60 in Fig. 1, and by manipulating the levers 61 and 62 on the gear box according to the index chart 63 attached to the box, the various cross feeds are obtained. Assuming then that the cam shaft 29 is capable of 6 speed changes, there would be a total of 288 different relative speeds between, for example, the scribing tool mounted on the cross-slide and the rotating cam blank.

By way of example, let it be assumed that it is desired to make a cam of the simple shape shown in Fig. 9, being a feed cam for a "U. S. Miller." The cam-blank 65, shown dotted, is 6" in diameter with a center hole 66 of 1⅛". The finished cam is to meet the following requirements:

| | |
|---|---|
| rise required _____inches__ | .375 |
| working surface_____ | 80/100ths |
| rise per division_____inches__ | .0046 |
| rise per 100 divisions_____do____ | .146 | maximum rise to be 16/100ths from the zero line

Since the required rise is .375", a point 67 is measured off on radius 16 which is 2.625" from the center (2.625" plus .375" being equal to 3.0", the radius of the cam-blank). The scribing tool is then set on point 67, and operation of the lathe is started.

Since it is required that for one complete revolution of the cam there be a rise of .460", it is determined by calculation that the gear box should be set to station 0.0115. With the cam rotating in the counter-clockwise direction as indicated by the arrow 68, and the feed for the cross-slide being "out" or away from the center, in the direction of arrow 69, the scribing tool will trace the curve designated 70. At point 71 on line 96 the cross-feed is stopped and the cam rotation will be stopped on the zero (0) line. The drop designated 72, between lines 0 and 16 is laid out by hand. The cam is then removed from the attachment and roughed out by suitable means such as a band-saw. The cam is then replaced on the cam-plate, and with the milling attachment 57 in position (Fig. 7) in place of the scribing tool attachment, the same procedure is repeated as with the scribing tool attachment. For ordinary cams not requiring accuracy of more than 3 thousandths per 3.6 degrees of the cam, the use of the milling attachment will generally be sufficient. However, when making cams which require accuracy to a thousandth per 3.6 degrees, the grinding attachment 59 (Fig. 8) is employed in place of the milling attachment, or after use of the latter, and the procedure is repeated as above.

In the making of more complicated cams on a production basis, such as for example the cam shown in Fig. 10, a chart of the following form may be utilized to advantage.

| 1 Operation | 2 Rise | 3 Gear Box Station | 4 100ths | 5 Ind. Point |
|---|---|---|---|---|
| Lobe 1 | .075 | .0125 | 15 | 20 |
| Dwell A | | | 9 | 38 |
| Lobe 2 | .030 | .0075 | 10 | 50 |
| Dwell B | | | 23 | 62 |
| Lobe 3 | .000 | | 17 | 90 |
| Dwell C | | | 7 | 11 |

In column 1 are marked the operations to be performed or the step sequence for the manufacture of the cam. In column 2 are marked the amount of rise (or drop) required for the respective operations indicated in column 1. In column 3 are marked the stations to be used on the quick change gear box 60. In column 4 are marked the number of hundredths of the cam-blank that are required for the respective operations, and in column 5 appear the index points with reference to the hundredths divisions at which the respective operations are to be started.

In the production of the hypothetical cam assumed above and shown in Fig. 10, a suitable cam-blank is selected and placed on the cam-plate 36. The latter will be one of several, depending upon the machine for which the cam is being made, various machines requiring differently sized center holes and different locations of the locating pin with reference to the zero line. Having placed the cam-blank on the cam-plate, they are oriented to the angular position shown in Fig. 10, and then secured to the cam shaft by a nut 75 as shown in Fig. 6. With the scribing tool attachment secured on the tool-post compound, the latter or the cross-slide or both are fed by hand to move the scriber to the starting point 80 of lobe 1 which according to column 5 of the chart is on line 20. With the gear box levers set to station .0125 (column 3), power to the lathe is turned on. With the cam-blank rotating in the direction of arrow 89 and the scriber feeding "out" in the direction of arrow 90, line 81 constituting the outer edge of lobe 1 will be inscribed during rotation of the cam-blank through the required 15/100ths (column 4). At point 82 the operator discontinues the power feed to the cross-slide, and by means of the hand knob 17' feeds the scriber "in" along the drop 83 to point 84 which according to the chart (column 5) is on line 38. At point 84 which is the beginning of dwell A, hand feed to the cross-slide is stopped, and during rotation of the cam-blank the required 9/100ths (column 4) line 85 is inscribed. At point 86 (which is on line 47) the scriber is fed "out" along line 87 to point 88 on line 50 (column 5). At this point which is the beginning of line 91 for lobe 2, the power feed to the cross-slide is again started, but with the gear box station set at .0075 (column 3). The same procedure as outlined above, but in accordance with the chart, is followed to make lobe 2, dwell B, etc. until the starting point at 80 is reached. This completes the cam lay-out mechanically and automatically. In order to finish the cam edge, the milling and/or grinding attachments are then utilized as explained above in connection with Fig. 9.

While I have shown and described a preferred embodiment of my invention, it will be understood that various modifications and changes will occur to those skilled in the art without departing from the spirit and scope of this invention. I therefore contemplate by the appended claims to cover any such modifications as fall within the true spirit and scope of my invention.

Having thus described my invention, what I claim as new and desire to secure by Letters Patent of the United States is:

1. A cam-making attachment for a lathe provided with a spindle and a cross-slide, comprising a fixture removably mounted on the bed of the lathe and in straddling relation with respect to the cross-slide, a shaft journalled within said fixture, a cam-blank to be shaped keyed to said shaft, reduction gearing between the lathe spindle and the cam shaft for rotating the latter and the cam-blank at a reduced speed, and a working tool mounted on the cross-slide of the lathe arranged to cooperate with the cam-blank, said cross-slide being power-fed at a speed having a predetermined relation with the spindle speed to cause the tool to perform its function on the cam-blank along a path which coincides with the finished cam surface.

2. A cam-making attachment for use with a lathe provided with a spindle and a cross-slide, comprising a fixture removably mounted on the bed of the lathe and in straddling relation with respect to the cross-slide, a shaft journalled within said fixture, a cam-blank to be shaped keyed to said shaft, reduction gearing between the lathe spindle and the cam shaft for rotating the latter and the cam-blank at a reduced speed, and a plurality of working tools selectively mounted on the cross-slide of the lathe arranged to cooperate with the cam-blank, said cross-slide being power-fed at a speed having a predetermined relation with the spindle speed to cause the selected tool to perform its individual function on the cam-blank along a path which coincides with the finished cam surface.

3. A cam-making attachment as defined in claim 2, wherein the plurality of working tools consist of a scriber, a miller and a grinder.

4. A cam-making attachment for use with a lathe provided with a spindle, a cross-slide and a quick change gear box, comprising a fixture removably mounted on the bed of the lathe and in straddling relation with respect to the cross slide, a shaft journalled within said fixture, a cam-blank to be shaped keyed to said shaft, reduction gearing between the lathe spindle and the cam shaft for rotating the latter and the cam-blank at a reduced speed, change gears for varying the relative speeds of said shaft and spindle, the quick change gear box of the lathe adapted to vary selectively the relative speeds of the lathe spindle and the cross-slide, and a working tool mounted on the cross-slide of the lathe arranged to cooperate with the cam-blank, the relative transverse movement of the cross-slide and the rotary movement of the cam-blank being such that the working tool performs its function on the cam-blank along a path which coincides with the finished cam surface.

5. A cam-making attachment as defined in claim 4 wherein the working tool may be either a scriber, a miller or a grinder.

6. A cam-making attachment for use with a lathe of the type having a quick change gear box, comprising a fixture having a pair of side walls, a top plate and an intermediate plate, means for clamping the fixture at the lower ends of the side walls to the bed of the lathe and in straddling relation with respect to the cross-slide of the lathe, a shaft extending vertically above the top plate and journalled at its lower end within the intermediate plate, a shaft extending between and journalled within the side walls of the fixture, reduction gearing consisting of a worm on the latter shaft and a worm wheel on the vertical shaft for driving the vertical shaft at a reduced speed, gearing interposed between the lathe spindle and the worm shaft for driving the latter at a selected desired speed, a cam-blank to be shaped keyed to said vertical shaft, and a work-engaging tool mounted on the cross-slide arranged to cooperate with the cam-blank, said cross-slide being power-fed at a speed determined by the setting of the quick change gear box and therefore at a speed which has a definite relation with the cam shaft speed, whereby during the operation of said lathe attachment said tool performs its function on the cam-blank along a path which coincides with the finished cam surface.

VINCENT J. MEANY.

REFERENCES CITED

The following references are of record in the file of this patent:

UNITED STATES PATENTS

| Number | Name | Date |
|---|---|---|
| 1,248,471 | Foster | Dec. 4, 1917 |
| 1,689,370 | Tessky | Oct. 30, 1928 |
| 1,714,926 | Scott et al. | May 28, 1929 |
| 2,192,888 | Blazek et al. | Mar. 12, 1940 |
| 2,455,662 | Dyer | Dec. 7, 1948 |

FOREIGN PATENTS

| Number | Country | Date |
|---|---|---|
| 579,541 | France | Aug. 5, 1924 |